United States Patent

Hoekstra

[11] Patent Number: 5,883,907
[45] Date of Patent: Mar. 16, 1999

[54] ASYMMETRICAL DIGITAL SUBSCRIBER LINE (ADSL) BLOCK ENCODER CIRCUIT AND METHOD OF OPERATION

[75] Inventor: George Hoekstra, Austin, Tex.

[73] Assignee: Motorola, Inc., Schaumburg, Ill.

[21] Appl. No.: 848,902

[22] Filed: May 1, 1997

[51] Int. Cl.$^6$ .................................................. G06F 11/00
[52] U.S. Cl. ........................................................ 371/37.11
[58] Field of Search ............................. 371/37.11, 37.07, 371/44, 45, 36.1, 39.1

[56] References Cited

U.S. PATENT DOCUMENTS 5,829,007  10/1998  Wise et al. ..................................... 711/5
5,832,234  11/1998  Iverson et al. ............................ 395/200

Primary Examiner—Vincent P. Canney
Attorney, Agent, or Firm—Keith E. Witek

[57] ABSTRACT

A method and apparatus for performing block encoding in an asymmetrical digital subscriber line (ADSL) system uses a pipelined structure. The parity check circuit (116) contains a plurality of pipeline stages (201, 203, 205, and 207). Each stage contains an ADSL input data register (200, 202, 204, and 206) at a beginning of each stage and a carry register (208, 210, and 212) separating each stage. Each stage contains a plurality of carry circuits (214–220) which are serially coupled together by carry signals. The plurality of carry circuits (214–220) use generator polynomial root ($\alpha$) processing involving serial carry propagation whereby the pipelining is implemented in the stages (201, 203, 205, and 207) in order to break the serial carry path from one long string to smaller segmented strings which are pipelined together. This pipelining is performed so that parity generation can occur at the higher frequencies required by ADSL systems.

40 Claims, 6 Drawing Sheets

ASYMMETRICAL DIGITAL SUBSCRIBER LINE (ADSL) BLOCK ENCODER CIRCUIT AND METHOD OF OPERATION

Cross Reference To Related Application

This application is related to our commonly assigned copending patent application entitled "ASYMMETRICAL DIGITAL SUBSCRIBER LINE (ADSL) PIPELINED REED-SOLOMON DECODER CIRCUIT AND METHOD OF OPERATION", Ser. No. 08/763,989, filed on Dec. 12, 1996.

FIELD OF THE INVENTION

The present invention relates generally to telecommunication integrated circuit, and more particularly to, block encoding of asymmetrical digital subscriber line (ADSL) frames.

BACKGROUND OF THE INVENTION

In asymmetrical digital subscriber line (ADSL) systems, Reed-Solomon encoding is used to perform forward error detection and correction. This Reed-Solomon encoding is typically performed by using a linear feedback shift register which must have access to sixteen different sets of unique generator polynomials which must be stored in memory. The total number of coefficients which must be stored in memory in order to provide the sixteen different sets for the Reed-Solomon encoder is one hundred and twenty. In order to provide the one hundred and twenty generator polynomial coefficients, most asymmetrical digital subscriber line (ADSL) systems provide the one hundred and twenty coefficients within read only memory (ROM) memory. This ROM memory consumes a significant amount of substrate surface area which adds costs to the ADSL system. Therefore, a need exists for a Reed-Solomon encoding scheme which does not require a significant amount of ROM memory for coefficient storage while maintaining asymmetrical digital subscriber line (ADSL) operation at frequencies equal to or greater than 55 MHz.

Figure 1:
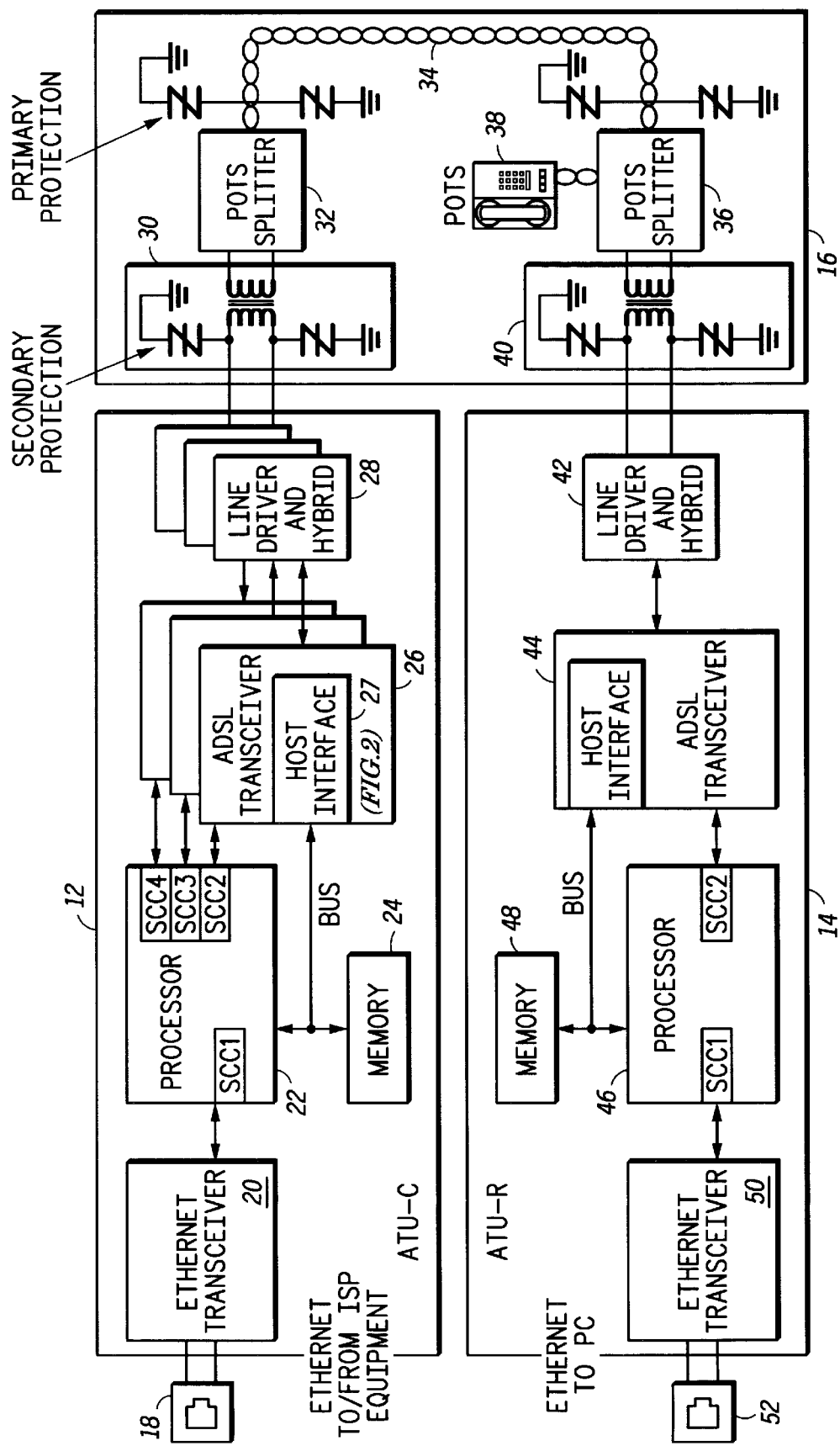
FIG. 1 illustrates, in block diagram form, an asymmetrical digital subscriber line (ADSL) system in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBOMIMENT

Generally, the present invention comprises an asymmetrical digital subscriber line (ADSL) block encoding circuit which performs Reed-Solomon encoding. This block encoder performs the Reed-Solomon encoding using a pipelined process. This block encoder uses the roots of the generator polynomial to perform Reed-Solomon encoding as opposed to the generator polynomial coefficients used in the prior art. By doing so, the block encoder taught herein requires only 16 total root coefficients whereas the prior art required ROM storage for 120 generator polynomial coefficients. Therefore, the Reed-Solomon encoder taught herein can obtain area savings over the prior art. In addition, since a pipelined hardware scheme is used for encoder herein, the root coefficient method can be utilized while maintaining speeds at 55 MHz or greater.

The invention can be further understood with reference to FIGS. 1 through 9 herein.

FIG. 1 is a block diagram illustrating duplex communication system 10 which is preferably an asymmetrical digital subscriber line (ADSL) system. The three main parts to the system 10 are transmitter 12, receiver 14, and phone infrastructure 16. In the transmitter 12, data is received on a communication interface 18 from a data source such as a computer (not shown). The interface 18 can operate at different speeds for different possible protocols, such as 10 megabit ethernet and 25 megabit asynchronous transfer mode (ATM) systems. Connected to the communications interface 18, is a transceiver 20. It handles the ATM or ethernet protocols provided on interface 18. A processor 22 receives data from the transceiver 20 and converts either the ATM data or the ethernet data to asymmetrical digital subscriber line (ADSL) data. One example of such a processor 22 is a Motorola MPC860EN microprocessor.

Coupled to the microprocessor 22 is memory 24. Memory 24 is preferably static RAM, but may be other types of memory, such as dynamic RAM. A plurality of ADSL DMT transceivers 26 receive and transmit data to and from microprocessor 22. One transceiver 26 is further illustrated in more detail in FIG. 2. The ADSL transceivers are coupled to and controlled by microprocessor 22 via host interface 27. The ADSL transceiver 26 converts a digital signal from the microprocessor 22 to an analog signal to be sent to line driver 28. Additionally, transceiver 26 encodes the signal in a DMT (discreet multitone) format. Line drivers 28 are the analog interface to copper wire that is typically used in the conventional U.S. telephone system.

Line drivers 28 connect to the phone infrastructure 16 through, a transformer 30 and a plain old telephone system (POTS) splitter 32. The transformer 30 isolates the transmitter 12 from the twisted pair copper wire 34 so that electrical problems on the telephone line are not destructive to the electronic circuitry coupled to the telephone line. Twisted pair 34 connects to a POTS splitter 32 at the receiving end via copper wire 34 which a typical telephone line. A standard telephone 38 is connected to the POTS splitter 36 of FIG. 1. This illustrates one of the advantages of ADSL systems over other technologies. ADSL systems allows high speed data to share already installed twisted pair lines 34 with voice telephone 38 thereby using miles of copper wire already in place in the U.S. and foreign countries. Separating the phone infrastructure 16 from the receiver 14 is a second transformer 40, again to physically isolate the two lines will still allowing electrical communication.

Receiver 14 receives data in line driver 42. The data is then transmitted from line driver 42 to ADSL receiver 44, which operates in a reciprocal manner to ADSL transceiver 26 in transmitter 12. The receiver 44 converts incoming analog signals to digital signals where the analog input includes DMT signals. The ADSL transceiver 44 transmits digital input data to microprocessor 46. Microprocessor 46 is coupled to memory 48 and controls operation of ADSL transceiver 44 via the host interface 27. Microprocessor 46 converts ADSL symbols (or data packets) to either ATM data or ethernet data. The transceiver 50 receives the digital data from the microprocessor 46, which handles the transmission protocol, such as ATM or ethernet. Transceiver 50 is coupled to a communications user via communications interface 52. This communications interface 52 can be an ethernet link, an ATM line, or a like communication medium.

Figure 2:
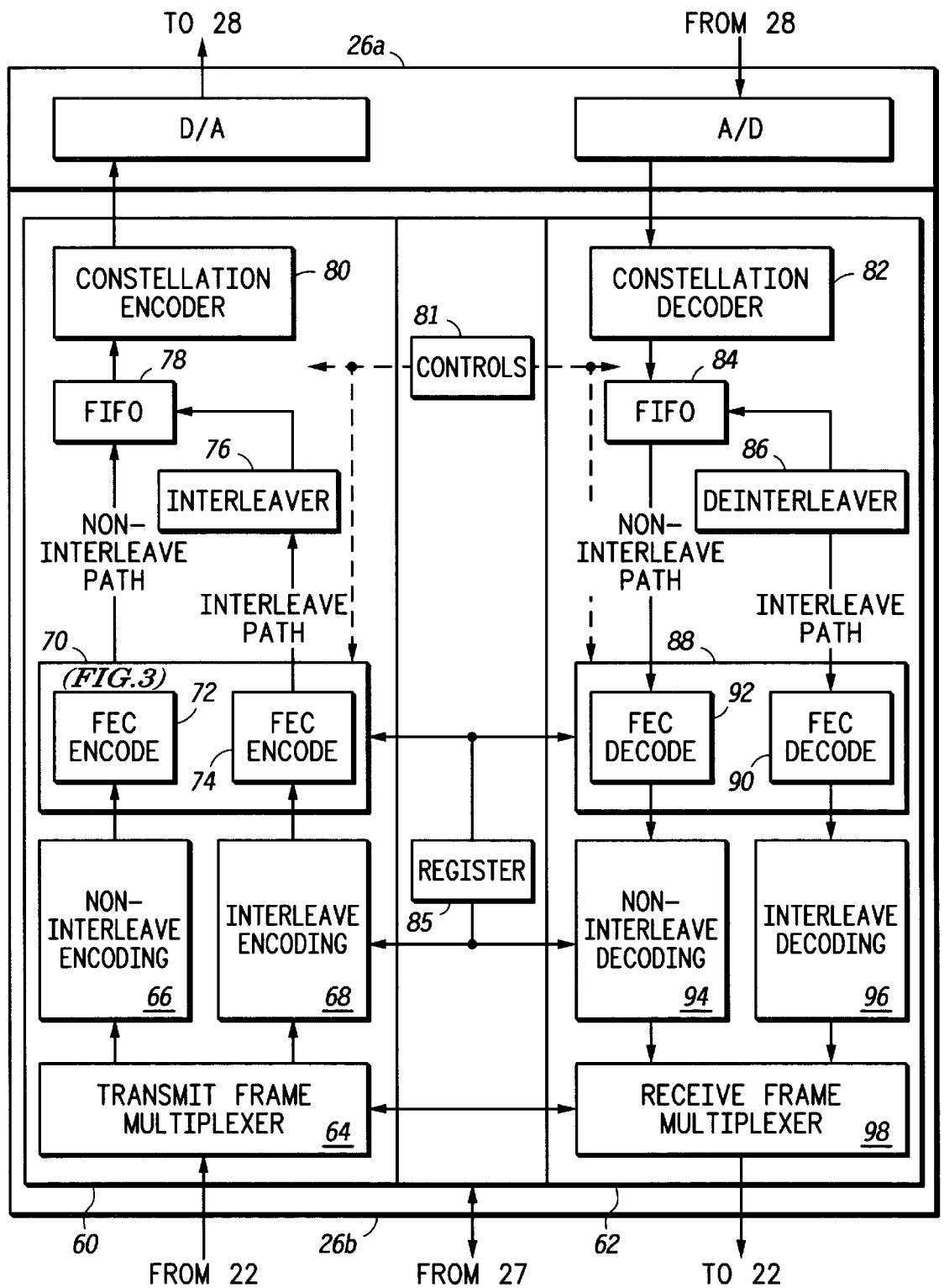
FIG. 2 illustrates, in block diagram form, the asymmetrical digital subscriber line (ADSL) transceiver of FIG. 1 in more detail and in accordance with the present invention.

FIG. 2 illustrates the ADSL DMT transceiver 26 which can function as either a transmitter or a receiver of ADSL data. Two sections are shown, an analog ADSL DMT transceiver portion 26a (an analog portion), and a digital ADSL DMT transceiver portion 26b. It should be understood that the analog portion 26a performs analog-to-digital (A/D) and digital-to-analog (D/A) conversions as are needed to provide data within the system. The digital ADSL DMT transceiver portion 26b contains a transmitter portion 60 and a receiver portion 62.

Starting with the transmitter 60, a transmit frame multiplexer 64 is coupled to non-interleaved encoding circuitry 66 and interleaved encoding circuitry 68. Encoding circuitry 66, 68 performs line coding and parity checking for the system. Coupled to the coding circuitry 66 and 68 is encoding circuitry 70. Encoding circuitry 70 performs forward error correction (FEC) non-interleaved encoding operations 72 as well as forward error correction (FEC) interleaved encoding operations 74 in a single encoding circuit (see FIGS. 3–5). Interleaved encoding circuitry 74 is coupled to interleaver 76. Interleaver 76 interleaves bytes of data for transmission in an interleaved manner. Interleaver 76 and encoding circuitry 72 are coupled to a first-in-first-out (FIFO) buffer 78 which is coupled to convolutional encoder 80. Convolutional encoder 80 adds convolution type error correction to the outgoing ADSL data stream.

Receiver 62 is a mirror image of transmitter 60. Data is received and decoded by convolution decoder 82. The data is then passed to FIFO buffer 84. FIFO 84 is accessed by deinterleaver 86 and decoding circuitry 88 which performs both interleave decoding 92 and non-interleave decoding 90. The two decode operations 90, 92 are done preferably by a single time shared circuit but may be separate circuits within the decoder 88. Receiving data from the non-interleaved forward error correction (FEC) decoder 92 is non-interleaved encoding circuitry 94 and receiving data from the interleaved FEC decoder 90 is interleaved decoding circuitry 96. Multiplexer 98 demultiplexes data from non-interleaved decoding circuitry 94 and interleaved decoding circuitry 96. The data from the demultiplexer 98 is transmitted to the microprocessor 22.

Controlling the ADSL transceivers 26 and 44 are control signals from microprocessors 22 and 46 via host interface 27. The control signals 81 configuration registers 85 of FIG. 2 are used by the microprocessors 22 or 46 to configure the circuitry of FIG. 2.

Figure 3:
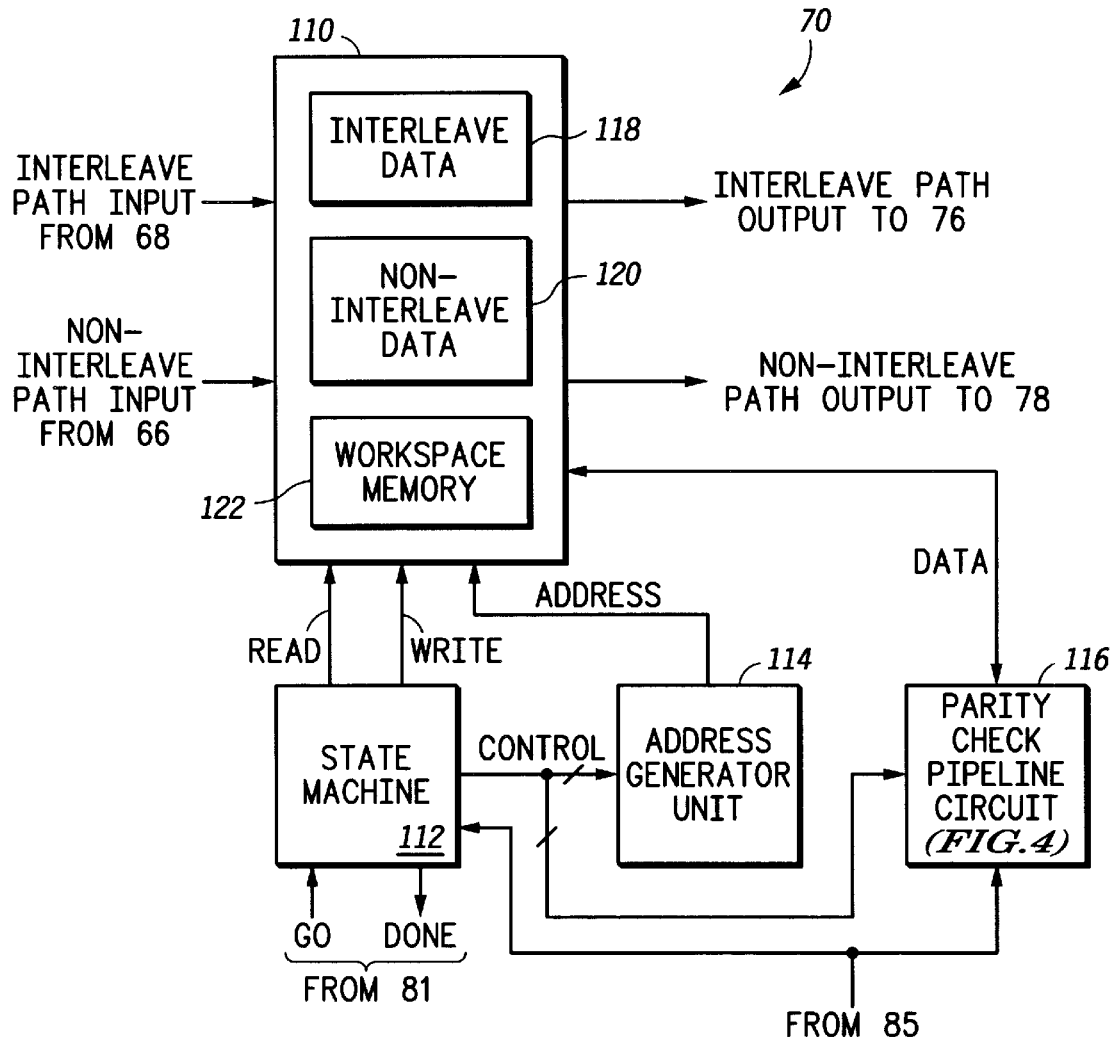
FIG. 3 illustrates, in block diagram form, the asymmetrical digital subscriber line (ADSL) block encoder of FIG. 2 in more detail and in accordance with the present invention.

FIG. 3 illustrates the block encoder 70, previously introduced in FIG. 2, in more detail. FIG. 3 illustrates the interleave data path input from interleave encoding circuitry 68. In addition, FIG. 3 illustrates the non-interleave data path input from non-interleave encoding circuitry 66. The interleave data path is a data path wherein data symbols are allowed to be intermixed with other symbols or spread further apart in time on the communication line. Non-interleave data paths are paths that are not allowed to perform these interleave operations. Therefore, these two data paths provided as output from circuitry 66 and 68 respectively provide non-interleave and interleave ADSL data to a memory device 110 within block encoder 70.

The memory 110 of FIG. 3 provides output parity information to the interleaver 76 of FIG. 2 and also provides a non-interleave parity information to the first-in-first-out (FIFO) buffer 78 of FIG. 2 as illustrated in FIG. 3. The term "parity information" is generically used herein to describe any information that is created to aid the ADSL system or a like communication system in binary error detection and/or correction.

A state machine 112 in FIG. 3 provides control to all the circuitry illustrated in FIG. 3. The state machine 112 is coupled to the memory 110 via a read control signal and write control signal. In addition, the state machine controls an address generator unit (AGU) 114 which generates addresses for read and write operations to the memory 110. In addition, to providing control for address generation, the state machine 112 controls the parity check pipelined circuit 116 of FIG. 3 which generates error correction and/or detection information for the ADSL system. In addition, control signals "go" and "done" are provided to state machine 112 of FIG. 3 via the control circuitry 81 of FIG. 2. The go signal is used to indicate to the circuitry of FIG. 3 that data is available within the memory 110 for parity processing. The done signal is a second handshake signal which is communicated to the control circuitry 81 of FIG. 2 to inform the control circuitry that parity generation has occurred in a proper fashion.

The parity checked pipelined circuit 116 accesses the interleave data 118 and the non-interleave data 120 in memory 110 and performs parity generation operations on both of these data types. Once parity information is obtained for a specific symbol or set of data, the parity information is provided back to the memory 110 as illustrated via FIG. 3. It is important to note, that in another embodiment, the parity information may be provided directly from the parity checked circuit 116 without requiring further storage within the memory 110. If the parity information is written to the memory, the memory may be used to provide the parity information as output to the devices 76 and 78 as illustrated in FIGS. 2–3.

The memory 110 contains a workspace area 122 which can be used to store state information from the parity checked pipelined circuit 116. This workspace memory 122 is used so that state of the circuit 116 can be selectively stored and selectively restored so that the parity checked pipelined circuit can be used to perform parity generation for many symbols of data in an interruptable manner where recovery is nondestructive. In other words, by using state storage and restoring, the circuit 116 can be processing parity for data A in a first time period, then be interrupted or required to begin processing on data B in a second time period following the first time period, be able to continue on with the data A parity calculations at some time after data B is finished processing without losing any parity progress made in the first time period. The state storing and restoring is further discussed with reference to FIG. 8.

Figure 4:
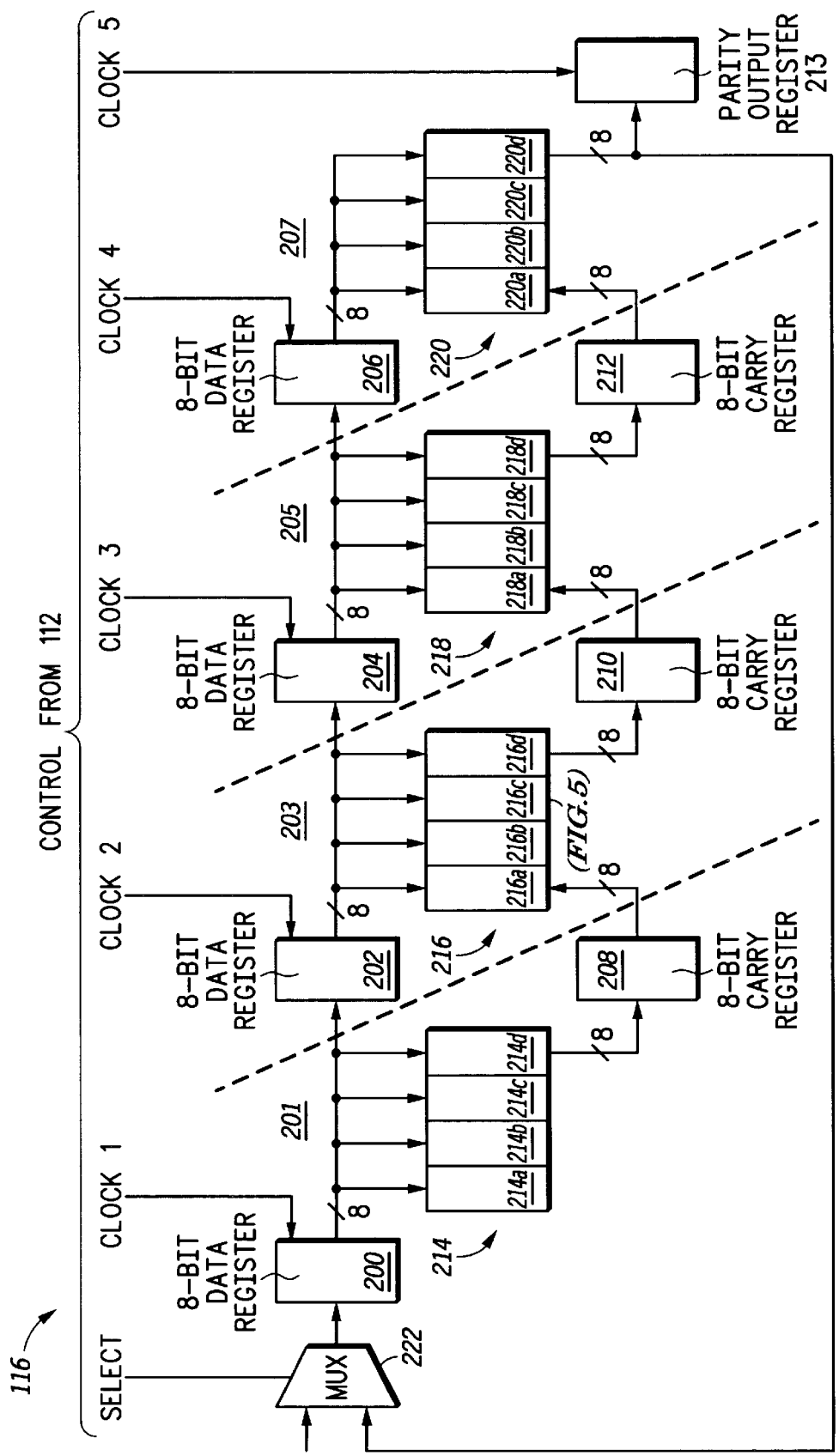
FIG. 4 illustrates, in a block diagram, the pipelined parity check circuit of FIG. 3 in more detail and in accordance with the present invention.

FIG. 4 illustrates the parity check pipelined circuit 116 of FIG. 3 in more detail. The algorithm for calculating parity which is performed by the circuit 116 of FIG. 4 is Reed-Solomon encoding. The circuitry in FIG. 4 utilizes the roots alpha ($\alpha$) of a generator polynomial in order to perform the Reed-Solomon encoding. The polynomial generally appears as $(1-\alpha_0 \cdot Z^{-1})(1-\alpha_1 \cdot Z^1) \ldots (1-\alpha_{15} \cdot Z^1)$, and it's theoretical mathematical origin is taught via "A Combined Reed-Solomon Encoder and Syndrome Generator with Small Hardware Complexity", by Fettweis and Martin Hassner, IEEE 1992, pp. 1871–1874 which is incorporated by reference herein. These values $\alpha_0$ through $\alpha_{15}$ are the sixteen coefficients which are utilized within the circuit of FIG. 4 and described in greater detail in FIG. 5. By using these coefficients $\alpha$, a circuit can be utilized to perform Reed-Solomon encoding whereby carries are generated. These carries are generated and serially propagated through sixteen stages of carry circuitry 214–220 in a serial manner. Since this serial propagation cannot occur within the 55 MHz or above frequency constraints of ADSL, the serial propagation of this carry must be split into stages (four stages 201, 203, 205, and 207 are illustrated in FIG. 4) in order to allow the carry propagation to occur within the 55 MHz or greater processing constraints of the ADSL system. Therefore, straight forward application of a carry circuit using the sixteen $\alpha$ values within a circuit is not possible, and instead pipelining must be used as illustrated in FIG. 4 to split the long serial carry chain into stages which can be clocked at a higher frequency.

FIG. 4 illustrates that the ADSL Reed-Solomon encoding is performed via a four stage pipeline. FIG. 4 illustrates a first stage 201, a second stage 203, a third stage 205, and a fourth stage 207. Each stage of the pipeline 201, 203, 205, and 207, contains an 8-bit data register 200, 202, 204, and 206. Each stage 201, 203, 205, and 207 of the pipeline contain four of the sixteen total carry generation circuits 214–220 discussed above. Therefore, stage 201 of the pipeline contains a set of four carry circuits 214 which are labeled individually as 214a, 214b, 214c, and 214d. The pipeline stage 203 contains four carry circuits 216 which are individually labeled as 216a through 216d. The pipeline stage 205 contains four carry circuits 218 which are individually labeled as circuits 218a through 218d. Finally, stage 207 contains for carry generations circuits 220 which are individually labeled as circuits 220a through 220d. Each set of four carry generation circuits in each stage of the pipeline operates in a similar manner. The carries are serially-provided from circuit 214a, to circuit 214b, to circuit 214c, to circuit 214d, to circuit 216a (through register 208), to circuit 216b, to circuit 216c, to circuit 216d, to circuit 218a (through register 210), to circuit 218b, to circuit 218c, to circuit 218d, to circuit 220a (via register 212), to circuit 220b, to circuit 220c, and finally to circuit 220d.

As an example of the operation of FIG. 4, stage 201 begins by latching input data in the register 200. The register 200 provides the input data in parallel to all four carry generation circuits 214a through 214d as illustrated in FIG. 4. The circuit 214a will generate values which are used to perform Reed-Solomon encoding and will provide output carries (8 in all since 8 input data bits are provided by register 200) to the stage 214b. The 214b will receive the data from the register 200 and the carries from the circuit 214a and produce additional carries to the 214c. The circuit 214c will process the data from register 200 and the carries from the circuit 214b and provide carry output information to circuit 214d. Finally, the circuit 214d will process the bits from the register 200 and the circuit 214c to provide an 8 bit output carry value which is latched in a register 208 of FIG. 4. Therefore, the registers 208, 210, and 212 are used to latch intermediate carry bits between the stages 201, 203, 205, and 207 of the pipeline in FIG. 4.

By performing the intermediate carry latching in the registers 208, 210, and 212, the serial time propagation of the carries through the sixteen carry circuits 214 through 220 of FIG. 4 can be split into four discreet clock cycles instead of one clock cycle. Therefore, the four clock cycles can operate at a greater frequency than the one larger clock cycle. The latching of carries via registers 208, 210, and 212 enables pipelining wherein each stage of the pipeline will be in a process of calculating a different set of 8 carry bits for a different data value (provided by one of registers 200, 202, 204, and 206) which will be used eventually to provide Reed-Solomon encoding for an ADSL data symbol. By limiting the serial carry propagation to four carry circuits as opposed to the entire sixteen carry circuits, the circuitry of FIG. 4 can operate at speeds equal to or greater than 55 MHz which is currently required for the operation of ADSL circuitry. It is important to note that although 8-bit data, four stages of pipelining, and sixteen carry circuits are taught, other sizes may be used to provide a similar result.

An input multiplexer 222 is used to provide the data from the memory 110 of FIG. 2 to the registers 200, 202, 204, and 206 of FIG. 4 in a pipelined manner. The pipeline data sequenced through the registers 200, 202, 204 and 206 are controlled by four clock signals referenced as clock 1, clock 2, clock 3, and clock 4 in FIG. 5 wherein these clock signals are provided via the state machine 112 of FIG. 3.

Figure 6:
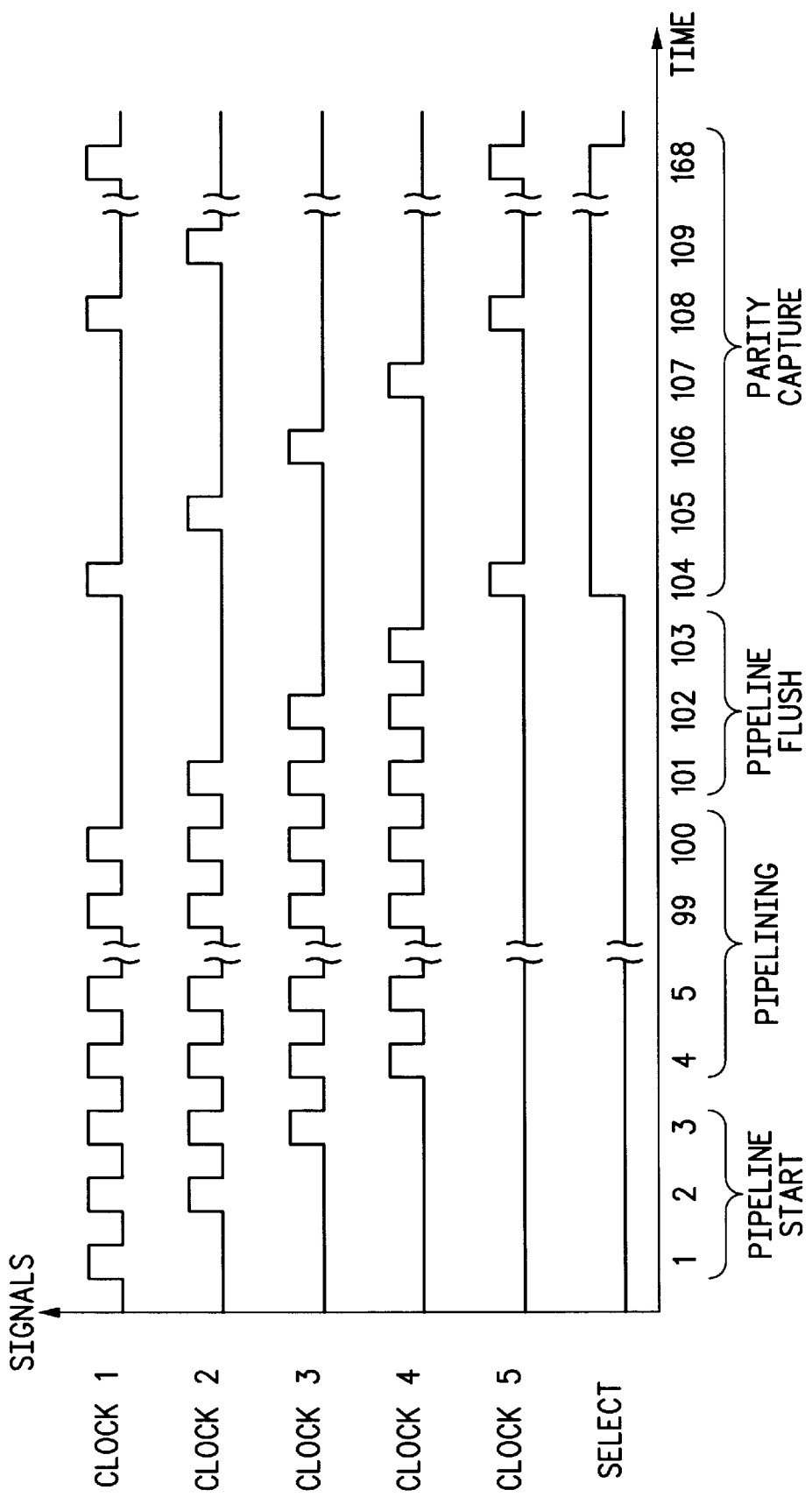
FIG. 6 illustrates, in a timing diagram, the clocking and select control signals which are provided to the parity of check circuit of FIG. 4 in accordance with the present invention.

See FIG. 6 for a detailed discussion of register clocking via the clocks 1–4 of FIG. 4. In addition, the multiplexer 222 of FIG. 4 can provide the output carry bits from the last stage 207 of the pipeline into the register 200 as new input data. This cycling of carry registers from the carry circuit 220d through to the data registers 200, 202, 204, and 206 is needed by the root ($\alpha$) algorithm in order to provide the proper finalized parity information to the parity output register 213 of FIG. 4. Once the feedback path from the circuitry 220d to the register 200 via the multiplexer 222 has provided a proper parity value on the output of 220d, the clock 5 provided by the control circuit 112 of FIG. 3 is used to latch one finalized 8-bit parity value into the parity output register 213 (see FIG. 6 for a more detailed discussion of clock 5). The clock 5 will be pulsed at the proper time periods in order to enable the capture of up to sixteen 8-bit parity values within the register 213. This parity information from register 213 is then provided to the memory 110 as illustrated in FIG. 4.

Figure 5:
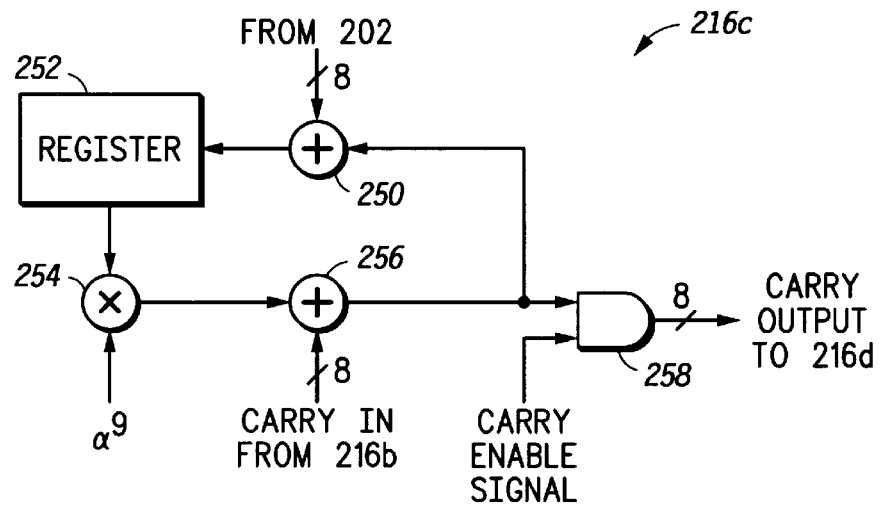
FIG. 5 illustrates, in a block diagram, the carry generation circuit which is used within the pipeline circuit of FIG. 4 in accordance with the present invention.

The circuitry contained within the carry circuits 214 through 220 is illustrated in more detail in FIG. 5. FIG. 5 illustrates a circuit which can be duplicated sixteen times in order to form the sixteen carry circuits 114 through 220 illustrated in FIG. 4. By way of example, FIG. 5 specifically illustrates the carry circuit 216c within stage 203 of FIG. 4. The 8-bit data value will enter the carry circuit 216c from the register 202 illustrated in FIG. 4. In FIG. 5, an adder 250 has a first input, a second input, and an output terminal. The first input of adder 250 receives the 8 bits of information from the data register 202 of FIG. 4. The adder 250 is typically a Galois adder which performs an add operation using exclusive OR (XOR) gates. The output of Galois adder 250 is stored within a register 252 illustrated in FIG. 5. Register 252 has an output which is provided to a Galois multiplier 254 The Galois multiplier 254 receives as input the root ($\alpha$) coefficients of the generator polynomial from ROM, RAM, hardwiring to VDD or VSS, or like memory as previous discussed. The exact implementation of the mathematics basis of this Reed-Solomon generator polynomial is discussed within "A Combined Reed-Solomon Encoder and Syndrome Generator with Small Hardware Complexity", by Fettweis and Martin Hassner, IEEE 1992, pp. 1871–1874. Each circuit 214 through 220 of FIG. 4 receives a unique one of sixteen roots ($\alpha$) which are preferably hardwired into the integrated circuit which contains FIG. 4. In another words, direct VDD and VSS connections are used to provide the proper root a to the proper circuit 214 through 220 in FIG. 4 since hardwiring provides the smallest surface area solution. A root ao is provided to the circuit 220d whereas as a root $\alpha_{15}$ is provided to a circuit 214a with the other $\alpha$ values being provided to the circuits therebetween and being sequentially numbered from 0 to 15. Therefore, the $\alpha$ value provided to the circuit 216c is referred to as $\alpha_9$. In some cases, the root's $\alpha$ are referred to as Galois numbers since the multiplier 254 is a Galois multiplier.

The Galois multiplier 254 multiplies the contents of the register 252 with the proper root coefficient $\alpha$ to provide an output to a second Galois adder 256. The second Galois adder 256 adds the output of the multiplier 254 and the carry input provided from the previous carry circuit 216b. This output of adder 256 is provided as input to AND gates 258 in FIG. 5. In addition, the output of the adder 256 is provided to the second input of the first adder 250 in FIG. 5. A unique carry enable signal is provided to each bank of AND gates 258 in each carry circuit 214 through 220 in FIG. 4. These carry enables signals allow the ADSL system to enable the use of any number of parity bytes for Reed-Solomon encoding which ranges from one byte to sixteen bytes. For example, eight of the carry enable signals may be activated to the circuits 214 through 220 of FIG. 4 to enable an eight byte parity generation wherein only eight bytes will be stored and validly provided from the parity output register 213 of FIG. 4. In another form, all sixteen bytes can be enabled or any number of bytes between one and sixteen can be enabled by the carry enable signals used in FIGS. 4 and 5. Therefore, FIG. 5 receives an eight bit value from one of the data registers 200, 202, 204, and 206, and receives carry input information from a previous carry circuit to perform Galois operations. These Galois operations in conjunction with input carry enable signals provides carry outputs which are serially routed between stages as previously discussed via registers 208, 210, and 212.

FIG. 6 is a timing diagram which should further clarify the pipeline methodology used within the hardware illustrated in FIG. 4. When pipelining begins, data is provided from the memory 110 of FIG. 3 to the input multiplexer (MUX) 222 of FIG. 4. The MUX select signal provided by the state machine 112 to the circuit 116 in FIG. 3 is illustrated in FIG. 6. The select is initially set low so that the multiplexer 220 provides the input data from the memory 110 to input of the register 200. When beginning the pipeline operation, the registers 200, 202, 204, and 206 will contain either garbage from reset or data from a previous operation. Therefore, it is better that this old data does not get clocked through the system to contaminate the current Reed-Solomon encoding. Therefore, the clocks 1, 2, 3 and 4 of FIG. 6 are enabled in a time serial fashion to allow for the pipeline to start via a pipeline start phase of FIG. 6.

In the pipeline start phase of FIG. 6, the clock 1 will be enabled in the first time period illustrated in FIG. 6. Since clock 1 is the only clock which is functioning in FIG. 6 in time period 1, an incoming data value from MUX 222 will be latched in register 200 whereas the other stages of the pipeline 203, 205, and 207 will be frozen. In a second time period, both clocks 1 and 2 are enabled in FIG. 6. This enabling of both clocks 1 and 2 will transfer the valid data from the register 200 from the register 202 to continue carry generation in the next stage 203 while providing new data to the register 200 through the multiplexer 222. In a time period 3 of FIG. 6, the clocks 1 through 3 are functional wherein valid data is now stored within registers 200, 202, and 204 to continue proper generation of the parity data in a pipelined manner. After the third time period in FIG. 6 the pipeline start stage is complete and the pipeline is now ready to begin full-pipeline operation. Therefore, for a rest of the 100 time periods utilized for an ADSL symbol which contains 100 data elements (by way of example), all four clocks 1–4 of FIG. 6 will be functioning simultaneously in a time overlapping manner. Therefore, in every clock cycle with time periods 4 through 100 in FIG. 6, a value from register 204 is shifted into 206, a value from register from 202 is shifted into register 204, a value from register 200 is shifted into register 202, and a new data value is latched within the register 200. With each data value latched within the registers 200 through 206, the carry circuitry 214 through 220 will process information and provide carry information to the storage locations 208, 210, and 212.

Fully functioning pipelining will continue for time periods 4–100 of FIG. 6 until the entire 100-byte long ADSL data symbol has been exhausted and a last value of the ADSL symbol has been placed within register 200. At this point, a pipeline flush stage is entered in FIG. 6. The pipeline flush stage is basically the pipeline start stage performed in reverse. In the pipeline flush stage, the clock 1 is disabled in a time period 101 of FIG. 6 so that the last data value is propagated from the register 200 to the register 202 while the register 200 is frozen so that no corruption of the data occurs. In a time period 202, both the clock 1 and the clock 2 in FIG. 6 and FIG. 4 have been disabled so that no corrupting data is latched into the registers 200 and 202 while the pipeline flushes the last few values through the remaining stages of the pipeline. In final time periods 102 and 103 of FIG. 6, the last data value is propagated to the end of the pipeline via register 206 to complete pipeline processing of the data symbol. After time period 103 in FIG. 6, pipelining ceases to be performed within the system of FIG. 4.

After time period 103 a fourth stage of parity generation referred to as the parity capture stage is begun in FIG. 6. In the parity capture stage of FIG. 6, the select signal from the state machine 112 is changed from a logic 0 to a logic 1. Therefore, the multiplexer 222 is switched to provide data from the circuit 220d to the register 200 instead of from the data input from the memory 110 in FIG. 3. Therefore, due to the select line change in logical value, the multiplexer 222 will now provide carry data from the carry circuit 220d instead of providing symbol data from the memory 110 of FIG. 3. In order to properly execute the remaining steps of the parity-generation algorithm, the parity capture cannot perform pipelining operations. Instead, the carry values from the carry circuit 220d are transferred one stage at a time to stage 201, then to stage 203, then through stage 204, and finally to stage 207 while all other stages remain frozen via the clock signals illustrated in FIG. 6. Therefore, the clocks 1 through 4 in FIG. 6 are used to serially perform final calculations within the circuit of FIG. 4 in a non-pipeline manner as is required to provide valid parity information to the register 213. In addition, whenever clock 1 is cycled to store a value within the register 200, the valid data present on the output of circuit 220d is latched within the circuit 213. Therefore, each 8-bit value which is latched within the register 213 requires four clock cycles in order to propagate completely from the left hand side of FIG. 4 to the right hand side FIG. 4. This sequential propagation from the left hand side of FIG. 4 to the right hand side of FIG. 4 is required to provide a proper 8-bit parity when using the α algorithm. If sixteen parity values are required to be time serially provided to register 213 as illustrated in FIG. 6, then the parity capture stage will require 64 clock cycles as illustrated in the parity capture state. When enabling fewer than sixteen values via the AND gates 258 of FIG. 5, fewer clock cycles will be needed.

Figure 7:
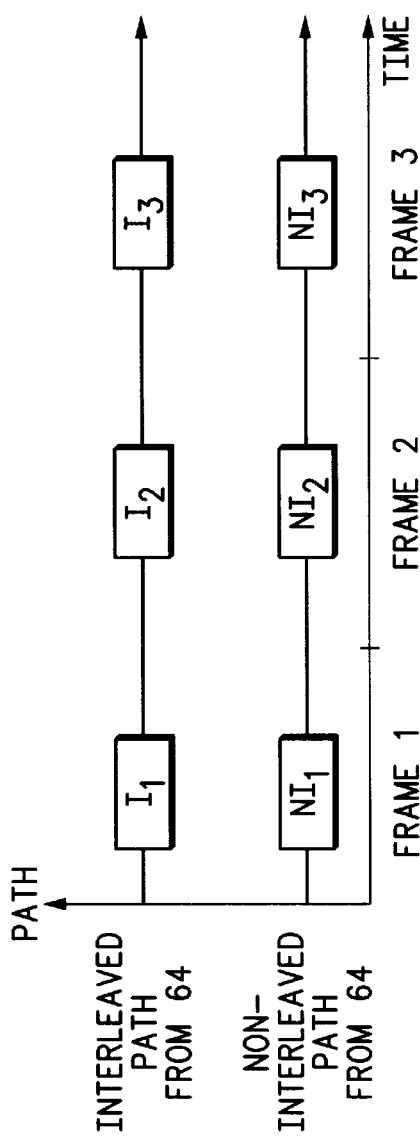
FIG. 7 illustrates, in a timing diagram, a method by which data is provided to the encoder 70 of FIG. 2 in accordance with the present invention.

FIG. 7 illustrates how the circuitry of FIG. 2 operates in greater detail. FIG. 7 illustrates that the conductive interconnects between the non-interleave encoding circuitry 66 and the encoder 70 of FIG. 2 provides an non-interleave data symbol (NI1) in parallel with an interleave data symbol (I1) which is provided to the encoder 70 via the circuitry 68. In general, FIG. 7 illustrates that the conductive connection between the circuit 68 and the circuit 70 provides an interleave symbol $I_n$ in parallel with a non-interleaved symbol $NI_n$ in a manner which is parallel in time.

Figure 8:
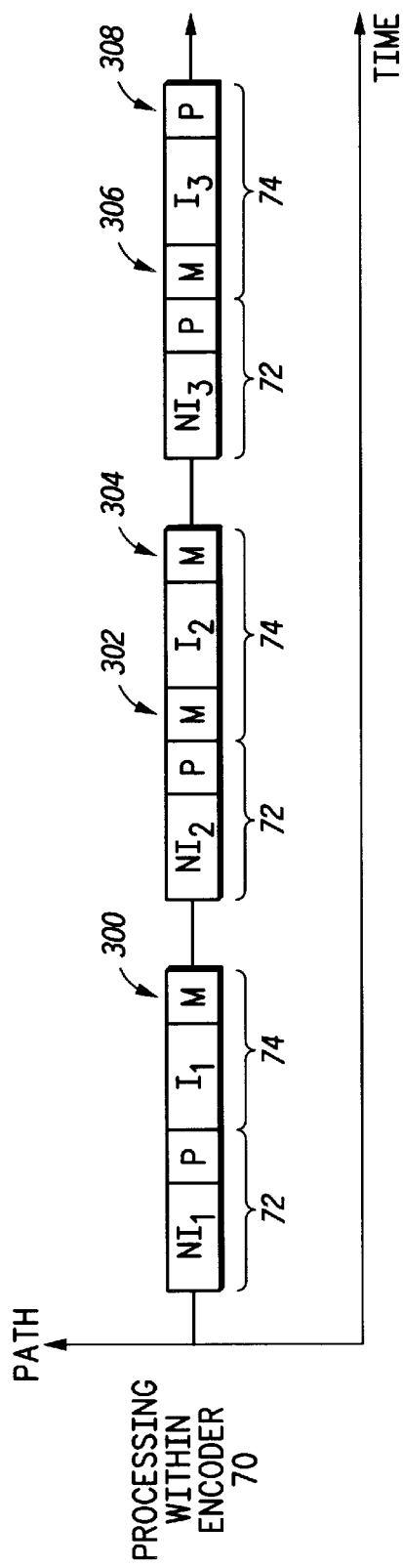
FIG. 8 illustrates, in a timing diagram, a method by which the encoder 70 of FIG. 2 processes both interleaved and non-interleaved data using a single set of hardware resources in accordance with the present invention.

FIG. 8 illustrates how the information provided from the circuits 66 and 68 as illustrated in FIG. 7 can be serialized via the encoder 70 so that a single set of hardware illustrated in FIG. 4 can be used to pipeline parity processing for both non-interleaved data symbols and interleaved data symbols in a time multiplexed manner. This time multiplexing of interleaved and non-interleaved data symbols through a single piece of parity hardware illustrated in FIGS. 3 and 4 is complicated by the interleaved path. Interleaved symbols on the interleaved path may be separated in time but may share a common parity block. For example, the interleaved packets I1, I2, and I3 illustrated in FIGS. 7 and 8 may be encoded as a single encoded entity whereas the parity provided from the encoder must be the parity for all of the interleaved symbols I1, I2, and I3 even though the symbols I1, I2, and I3 are provided to the encoder at different times.

In the prior art, this problem was handled by having separate hardware for the interleave path and the non-interleave path. By having different hardware for each path, the interleaved coding which was occurring on the hardware for interleaved path would not be interrupted by the non-interleaved path resulting in a discontinuity and destruction of the partial encoding of various interleaved symbols.

When the circuitry of FIG. 4 is used to provide parity processing for both the non-interleave and interleaved data communicated as illustrated in FIG. 7, a mechanism is utilized to allow the grouping of various interleaved data into a single encoding sequence. The mechanism that allows many symbols separated by time to be encoded as a contiguous block is the workspace memory 122 of FIG. 3. The memory 110 of FIG. 3 has a workspace area 122 which can be used to store the state of the encoder circuit 116 of FIG. 4. The "state" of the circuit in FIG. 4 is the contents of the registers 202 through 206, the registers 208 through 212, and all 16 of the registers 252 of FIG. 5 which are located in each of the sixteen carry circuits 214 through 220. These twenty-two 8-bit register values may either be provided by a parallel interface to the memory 110 or may be provided by a serial scan chain design to the memory 110. Therefore, state store and restore operations may be performed on the registers of FIGS. 4 and 5 between the circuit 116 and the memory workspace 122 of FIG. 3 so that the circuitry of FIG. 4 is interruptable in a nondestructive manner.

This process of saving the state of the circuit of FIG. 4 and reinstalling the state to perform nondestructive interrupting of decoding operations is illustrated via the time line of FIG. 8. In FIG. 8, the circuitry of FIG. 4 is first used to perform a non-interleaved encoding 72 on the non-interleave symbol NI1. Since non-interleaved symbols have collections of parity information which are not divided in a complicated manner as are interleaved symbols, the parity which is calculated for NI1 is provided along with the data via the P region in FIG. 8 that follows the NI1 region. Therefore, no storing of the state from FIG. 4 is needed when calculating the parity for NI1. However, after performing the parity calculations for NI1, the parity calculations for I1 are performed. The state machine 112 of FIG. 3 determines that the parity calculation for I1 of FIG. 8 is to be combined with the parity calculations of I2 and I3 of FIG. 8. However, the hardware register value stored within FIG. 4 must be erased by the non-interleaved parity calculations which will be performed subsequently by NI2 as illustrated in FIG. 8. Therefore, the contents of all the registers in FIGS. 4 and 5 are saved to the memory 110 via a state save operation 300 illustrated in FIG. 8 by the region M.

Since the state of all of the registers in FIGS. 4 and 5 are saved in memory 110, the non-interleaved processing for the data NI2 can be performed by the circuitry of FIG. 4 without worrying about destruction of the parity operations previously performed for I1. Once the parity for NI2 is complete and provided as output via the circuit of FIG. 4, the state which is stored in memory workspace 122 of FIG. 3 is written to the registers within FIGS. 4 and 5 via a state restore process 302 of FIG. 8. Once the state of FIGS. 4 and 5 has been restored from memory 110 via the restore operation 302 of FIG. 8, the encoding of the data I2 can continue where the encoding of the values of I1 previously left off. At the end of the I2 encoding, the state of the circuitry of FIGS. 4 and 5 is saved back to the memory workspace 122 of FIG. 3 via a step 304 in FIG. 8. This storing via the step 304 in FIG. 8 allows the noninterleaved data NI3 to be processed via the hardware of FIG. 4 and FIG. 5 in a nondestructive manner. A state recover step 306 is then performed in FIG. 8 to read the state stored in step 304 of FIG. 8 back into the circuitry of FIG. 4 and FIG. 5 from the workspace 122 of FIG. 3. Therefore, the Reed-Solomon encoding of the interleaved data I3 can continue where the Reed-Solomon encoding of I2 left off previously.

In summary, FIG. 8 illustrates that three interleave packets I1, I2, and I3 have been grouped together as a common encoded unit without loss of computation due to store and restore operations. Therefore, the parity is provided for the data I1, I2, and I3 via a step 308 of FIG. 8. It is important to note that any number of interleaved data segments can be grouped together and encoded as a common unit as long as the number of interleaved segments used in this fashion does not exceed sixteen symbols in the ADSL system. Therefore, the hardware of FIG. 4 and FIG. 5 along with the memory 110 in the state machine 112 of FIG. 3 can be used such that the same hardware can process both the interleaved and non-interleaved data paths of FIG. 2 in a nondestructive and time efficient manner.

Thus, it is apparent that there has been provided, in accordance with the present invention, a method and apparatus for block encoding ADSL data symbols in pipeline manner using root coefficients a of a generation polynomial. Although the invention has been described in illustrated with reference specific embodiments, it is not intended that the invention be limited illustrative embodiments. It is possible that the pipelined technology taught herein can be used for other communication applications than ADSL. The specific data sizes, data widths, and timing constraints taught herein may vary from design to design. Those skilled in the art will recognize that modifications and variations may be made without departing from the spirit and scope of this invention. Therefore, it is intended that this invention encompass all variations and modifications as far within the scope of the appended claims.

What is claimed is:

1. An pipelined block encoder for encoding data, the pipelined block encoder comprising:

a pipelined circuit, the pipelined circuit containing a plurality of stages, each stage containing circuitry for generating carry outputs, the pipelined circuit processing the carry outputs to create parity information;

circuitry for providing data values in a serial stream to input of the pipelined circuit to enable generation of the parity information; and storage circuitry for storing the parity information, the parity information being used for error detection when transmitting the data.

2. The pipelined block encoder of claim 1 wherein the parity information is used to correct errors within the data once these errors are detected.

3. The pipelined block encoder of claim 1 wherein each data value provided to the pipelined circuit in the serial stream is a data value which contains more than one bit of data.

4. The pipelined block encoder of claim 1 wherein the pipelined circuit is used to encode information from an interleaved data path in a first time period and a noninterleaved data path in a second time period.

5. The pipelined block encoder of claim 1 wherein the pipelined circuit is used to provide Reed-Solomon encoding.

6. The pipelined block encoder of claim 1 wherein the pipelined circuit is used to provide encoding for use in an asymmetric data subscriber line (ADSL) system.

7. The pipelined block encoder of claim 1 wherein the pipelined circuit contains at least four stages wherein the data is provided through the at least four stages in a time serial manner whereby the data in each state is processed to provide the parity information.

8. The pipelined block encoder of claim 1 wherein one stage of the pipelined circuit comprises:

a first register to store incoming data from the serial stream of data;

a plurality of carry generation circuits coupled to the first register, the plurality of carry generation circuits generating carry bits in response to the incoming data from the first register; and a second register for storing carry information in order to provide the carry information to a next stage of the pipelined circuit.

9. The pipelined block encoder of claim 1 wherein one stage of the pipelined circuit comprises:

a first register having an input and an output, the first register being used to store incoming data from the serial stream of data;

a first carry generation circuit having a data input coupled to receive the data from the output of the first register, the first carry generation circuit generating a first set of carry bits in response to the incoming data from the first register;

a second carry generation circuit having a data input coupled to receive the data from the output of the first register and an input for receiving the first set of carry bits, the second carry generation circuit generating a second set of carry bits in response to the incoming data from the first register and the first set of carry bits;

a third carry generation circuit having a data input coupled to receive the data from the output of the first register and an input for receiving the second set of carry bits, the third carry generation circuit generating a third set of carry bits in response to the incoming data from the first register and the second set of carry bits;

a fourth carry generation circuit having a data input coupled to receive the data from the output of the first register and an input for receiving the third set of carry bits, the fourth carry generation circuit generating a fourth set of carry bits in response to the incoming data from the first register and the third set of carry bits; and a second register for storing the fourth set of carry bits in order to provide the fourth set of carry bits to a next stage of the pipelined circuit.

10. The pipelined block encoder of claim 1 wherein one stage of the pipelined circuit contains a storage device for storing data and a carry circuit coupled to the storage device, the carry circuit comprising:

an first adder having a first input coupled to the storage device, a second input, and an output;

a register having an input coupled to the output of the first adder and an output;

a multiplier having a first input coupled to the output of the register, a second input for receiving a value from memory (a), and an output; and a second adder having a first input coupled to the output of the multiplier, a second input coupled to receive carry information, and an output coupled to the second input of the first adder to provide a carry output value.

11. The pipelined block encoder of claim 10 wherein the carry circuit further comprises:

a logic gate having a first input coupled to the output of the second adder and a second input coupled to a carry enable signal to enable or disable the carry output value.

12. The pipelined block encoder of claim 1 wherein one stage among the plurality of stages comprises:

a carry circuit for generating a carry wherein the carry circuit comprises a Galois adder.

13. The pipelined block encoder of claim 1 wherein one stage among the plurality of stages comprises:

a carry circuit for generating a carry wherein the carry circuit comprises a Galois multiplier.

14. The pipelined block encoder of claim 1 wherein each stage of the plurality of stages contains a plurality of carry circuits wherein each carry circuits receives a unique Galois field index to enable generation of the parity information.

15. The pipelined block encoder of claim 1 wherein each stage of the plurality of stages multiplies the data by a root (a) of a generator polynomial.

16. The pipelined block encoder of claim 1 wherein a data input of the pipelined circuit is coupled to a multiplexer, the multiplexer providing either an incoming data stream as input data to the pipelined circuit or providing carry bits from an output of the pipelined circuit as input data to the pipelined circuit.

17. An encoder comprising:

a first input for receiving interleaved data from an interleaved data path;

a second input for receiving noninterleaved data from a noninterleaved data path;

encoder circuitry wherein the encoder circuitry determines parity bits for the interleaved data in a first time period and determined parity bits for the noninterleaved data in a second time period;

a first output for providing parity information for the interleaved data; and a second output for providing parity information for the noninterleaved data.

18. The encoder of claim 17 wherein the encoder is used to provide parity information for use in an asymmetric data subscriber line (ADSL) system.

19. The encoder of claim 17 wherein the encoder circuitry comprises a linear feedback shift register (LFSR).

20. The encoder of claim 17 wherein the encoder circuitry comprises a pipelined circuit wherein data is serially shifted in stages and processed in stages through the pipelined circuit to arrive at the parity information.

21. The encoder of claim 17 wherein the encoder circuitry comprises a pipelined circuit wherein Galois field values are used to generate the parity information.

22. The encoder of claim 17 wherein the encoder circuitry comprises a pipelined circuit wherein one stage of the pipelined circuit comprises:

a first register to store either the interleaved data or the noninterleaved data as incoming data;

a plurality of carry generation circuits coupled to the first register, the plurality of carry generation circuits generating carry bits in response to the incoming data from the first register; and a second register for storing carry information in order to provide the carry information to a next stage of the pipelined circuit.

23. The encoder of claim 17 wherein the encoder circuitry is coupled to a memory device, the memory device storing both interleave data and noninterleave data.

24. The encoder of claim 17 wherein the encoder circuitry is coupled to a memory device, the memory device storing a state of the encoder circuitry.

25. The encoder of claim 24 wherein the memory device stores the state of the encoder circuitry at a first time period after encoding a first set of data values, the encoder circuitry being used to perform other operations for a second time period which follows the first time period, the state of the encoder circuitry being restored at a third time period following the second time period, the third time period receiving a second set of data values so that encoding of the second data values can continue with the state restored.

26. The encoder of claim 24 wherein the memory device stores:

(1) contents of a plurality of registers which are used to provide data to each stage of a pipeline; (2) contents of a plurality of registers within a plurality of carry circuits within the pipeline; and (3) contents of carry registers within each stage of the pipeline in order to store the state of the encoder circuitry.

27. An asymmetric data subscriber line (ADSL) block encoder comprising:

a first set of registers for storing input data as stored data;

carry circuits for receiving the stored data from the first set of registers and receiving Galois field values from memory, the carry circuits processing the stored data and the Galois field values to provide ADSL parity information; and a parity storage device for capturing the ADSL parity information for use in transmission of ADSL data, wherein the first set of registers are clocked at a frequency greater than 50 MHz.

28. The asymmetric data subscriber line (ADSL) block encoder of claim 27 wherein the carry circuits are groups into sets of carry circuits and the sets of carry circuits are configured in a pipelined circuit wherein each set of carry circuits reside in a separate stage of the pipelined circuit whereby the ADSL parity information is generated via a pipelined method.

29. The asymmetric data subscriber line (ADSL) block encoder of claim 27 wherein the asymmetric data subscriber line (ADSL) block encoder comprises a pipelined circuit wherein one stage of the pipelined circuit comprises:

a first register to store incoming data from the serial stream of data;

a sub-set of the carry circuits coupled to the first register, the sub-set of carry circuits generating carry bits in response to the incoming data from the first register; and a second register for storing carry information in order to provide the carry information to a next stage of the pipelined circuit which contains another sub-set of the carry circuits.

30. An asymmetric data subscriber line (ADSL) block encoder comprising:

a memory for receiving input data from an ADSL interleaved path and an ADSL noninterleaved path, the memory storing interleaved data and noninterleaved data;

an address generation unit (AGU) for generating addresses which are used by the memory;

a parity check circuit which reads the input data from the ADSL interleaved path and generates parity information for interleaved data and reads input data from the ADSL noninterleaved path and generates parity information for noninterleaved data, the parity information being provided as an output for use in data transmission; and a state machine for providing control information to the memory, the address generation unit (AGU), and the parity check circuit.

31. The asymmetric data subscriber line (ADSL) block encoder of claim 30 wherein the state machine provides a plurality of clock signals to the parity check circuit wherein the plurality of clock signals control data storage within the parity check circuit.

32. The asymmetric data subscriber line (ADSL) block encoder of claim 30 wherein the state machine provides a multiplexer select signal to the parity check circuit to control a source of data input to a register within the parity check circuit.

33. The asymmetric data subscriber line (ADSL) block encoder of claim 30 wherein the parity check circuit is pipelined in stages to produce parity information.

34. The asymmetric data subscriber line (ADSL) block encoder of claim 30 wherein a state of the parity check circuit is occasionally stored in the memory when a certain operational condition is met.

35. The asymmetric data subscriber line (ADSL) block encoder of claim 30 wherein the parity check circuit writes parity information to the memory wherein the memory contains two outputs to provide parity information to the ADSL interleaved path and the ADSL noninterleaved path.

36. A method for pipeline-calculating parity information for an ADSL transmission, the method comprising the steps of:

providing a parity check circuit containing a pipeline having a plurality of stages, each stage in the plurality of stages having a register for storing incoming pipeline-provided data and carry generation circuitry;

providing clock cycles to the plurality of stages so that the pipeline is filled with valid pipeline-provided data one stage at a time;

providing simultaneous clock cycles to all stages of the pipeline for a specified number of cycles to allow the carry generation circuitry to determine carry values; and providing substantially non-overlapping clock cycles to each stage of the pipeline to propagate the parity information to a parity capture circuit.

37. The method of claim 36 further comprising the step of:

providing clock cycles to the plurality of stages so that the pipeline is flushed of valid pipeline-provided data before the step of providing substantially non-overlapping clock cycles.

38. A method for finding parity information in an ADSL system, the method comprising the step of:

processing parity for a first non-interleaved data symbol from a non-interleaved ADSL path within a parity circuit in a first time period;

processing parity information for a first interleaved data symbol from an interleaved ADSL path within the parity circuit in a second time period following the first time period;

storing a state of the parity circuit in a memory;

restoring the state of the parity circuit from the memory to the parity circuit;

continuing to process parity information on a second interleaved data symbol from the interleaved ADSL path in a third time period occurring after the second time period; and providing output parity information from the parity circuit wherein the parity information contains parity information for both the first and second interleaved data symbols.

39. The method of claim 38 further comprising a step of:

processing parity for an second non-interleaved symbol from the non-interleaved ADSL path between the steps of storing and restoring.

40. The method of claim 38 further comprising a step of:

restoring a previously stored state from memory to the parity circuit before performing the step of processing parity information for a first interleaved data symbol.

* * * * *